(12) United States Patent
Fujimoto et al.

(10) Patent No.: US 6,707,564 B1
(45) Date of Patent: Mar. 16, 2004

(54) IMAGE FORMING APPARATUS

(75) Inventors: Osamu Fujimoto, Yamatokoriyama (JP); Syoichiro Yoshiura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/487,084

(22) Filed: Jan. 19, 2000

(30) Foreign Application Priority Data

Jan. 19, 1999 (JP) .......................... P11-009999

(51) Int. Cl.$^7$ ................................ G06E 15/00
(52) U.S. Cl. ................ 358/1.14; 358/3.28; 380/202; 705/57; 705/56; 705/58
(58) Field of Search ................ 358/500, 501, 358/3.28, 539, 284; 382/312, 276; 380/54, 201, 202; 399/366; 705/57, 56, 58; 713/176, 193

(56) References Cited

U.S. PATENT DOCUMENTS

| | | | |
|---|---|---|---|
| 5,257,119 A | 10/1993 | Funada et al. | 358/438 |
| 5,363,202 A | 11/1994 | Udagawa et al. | 358/501 |
| 5,465,161 A | 11/1995 | Funada et al. | 358/438 |
| 5,481,377 A | 1/1996 | Udagawa et al. | 358/501 |
| 5,737,100 A | 4/1998 | Funada et al. | 358/501 |
| 5,742,408 A | 4/1998 | Funada et al. | 358/501 |

FOREIGN PATENT DOCUMENTS

| | | |
|---|---|---|
| EP | 0 637 165 | 2/1995 |
| JP | 4294682 | 10/1992 |
| JP | 05014682 | 1/1993 |
| JP | 05091316 | 4/1993 |

OTHER PUBLICATIONS

European Search Report regarding Application No. 00300345.6 dated Nov. 6, 2002.

*Primary Examiner*—Edward Coles
*Assistant Examiner*—Zebene Sanbet
(74) *Attorney, Agent, or Firm*—Renner, Otto, Boisselle & Sklar

(57) ABSTRACT

An object of the invention is to allow secure identification of an image forming apparatus from an image on a recording medium on which the black image has been formed, thereby preventing leakage of secret information on the black image securely. A driving roller, a tensioning roller and a supporting member are supported to a frame so as to be movable in upward and downward directions, and a portion spacing mechanism moving an elevating rod in upward and downward directions by rotation of a motor is provided. At a time of the black-image forming process, the driving roller, the tensioning roller and the supporting member are moved downward by the portion spacing mechanism, a transfer conveying belt and transferring devices are spaced from photosensitive drums included in image forming stations for forming magenta and cyan images, and only the image forming process regarding a black image and an image of identification information obtained at image forming stations are made effective.

9 Claims, 6 Drawing Sheets

IMAGE FORMING APPARATUS

BACKGROUND OF THE INVENTION

1. Field of the Invention

The present invention relates to an image forming apparatus for reproducing an image which is read from an original or inputted from an image output apparatus on a recording medium such as a sheet of paper, and particularly to an image forming apparatus for forming an image with an additional image which represents identification information specific to or inherent in the image forming apparatus.

2. Description of the Related Art

In recent years, digital color-image forming apparatuses (copiers, printers and the like) capable of reproducing a color image with fidelity are made commercially available, and color images can be easily reproduced on recording mediums. Accordingly there is a fear that the color-image forming apparatus is unfairly used because images of bills, securities etc. whose reproduction is inhibited can be easily reproduced.

Therefore, the invention of Japanese Examined Patent Publication JP-B2 2614369 has a configuration where, when a color-image input is recorded and reproduced on a recording medium, a pattern image representing identification information inherent to an image forming apparatus is added to the color image with color material difficult to be discriminated by human eyes.

According to the configuration, the pattern image inherent to the image forming apparatus is added on bills, securities or the like which have been reproduced unfairly by the color-image forming apparatus so that the reproduced bills, the securities or the like can be prevented from being used as legal bills, securities or the like and an image forming apparatus which has performed the unfair image forming process can be identified by the added pattern image.

However, in some cases, for example, a case where a document or the like which should be prevented from being externally leaked to be kept secret has been reproduced without permission, it is necessary to identify an image forming apparatus in which the image forming process has been performed whether or not the image forming process is of color-image forming or monochrome image forming. However, a conventional image forming apparatus is configured to add a pattern image representing identification information for identifying the image forming apparatus only when a color image has been formed. The identification of image forming apparatus is carried out by the identification information added at the time of forming a color image. There is a problem that in the case of forming a monochrome image it is impossible to identify the image forming apparatus which has performed a monochrome image forming process and therefore reproduction of documents which should be prevented from leaking externally to be kept secret can not be restricted. Such a problem generally occurs in a conventional image forming apparatus irrespective of image forming type.

In Japanese Examined Patent Publication JP-B2 2614369 (corresponding U.S. Pat. Nos. 5,742,408; 5,737,100; 5,465,161; 5,257,119), by adding a specific pattern at shorter pitches than a short width of a paper sheet with a color material difficult to be identified by human eyes, the specific pattern is necessarily formed on a paper sheet on which an image has been formed, so that an apparatus which has been used for image formation can be identified. Also, in Japanese Unexamined Patent Publication JP-A 5-91316 (1993) (corresponding U.S. Pat. Nos. 5,481,377; 5,363,202), a check is performed about whether or not an add-on board which generate specific pattern is normally mounted on a reproducing machine body. When the add-on board has been mounted normally, a reproducing operation is performed, and when the add-on board has not been mounted normally, a reproducing operation is inhibited, so that a specific pattern is securely added. Furthermore, in Japanese Unexamined Patent Publication JP-A 5-14682 (1993) (corresponding U.S. Pat. Nos. 5,742,408; 5,737,100; 5,465,161; 5,257,119), when achromatic (black and white) image data has been inputted, the inputted achromatic image data is outputted without adding a pattern thereto, and when a chromatic (color) image data has been inputted, the inputted chromatic image data is added with a pattern to be outputted, so that an image quality for a reproduced monochrome image is held in an excellent state though a function for adding a specific pattern on a reproduced image has been provided.

However, in the conventional art, namely JP-B2 2614369, JP-A 5-91316, and JP-A 5-14682, since there is no configuration that only a black image and an identification information image are formed by adjusting intervals or spaces between image forming portions for respective colors and a paper sheet, for example, when a color image is formed on an identification information image formed together with a black image, it becomes impossible to identify the identification information image. Thereby, it is made impossible to identify an apparatus which has performed image forming, so that an unfaith image forming process relating to a black image of a document to be held in a secret state or the like can not be prevented from being performed.

SUMMARY OF THE INVENTION

An object of the present invention is to provide an image forming apparatus which securely forms an identification information image inherent to the image forming apparatus on an recording medium at a time of a black-image forming, by which the apparatus which has performed a black-image forming process can be identified and capable of suppressing an unfaithful black-image forming process of documents to be held in a secret state or the like.

The invention provides an image forming apparatus comprising:

a black-image forming portion for carrying out a black-image forming process for forming a black image on a recording medium;

a first color-image forming portion for carrying out a color-image forming process by which a color image is formed on a recording medium;

an identification information adding portion for adding identification information data which represents identification information inherent to the apparatus;

an identification information image forming portion for carrying out a process of forming an identification information image based on the identification information which is added by the identification information adding portion, on the recording medium at a time of the black-image forming process; and color-image forming disabling means for disabling the color-image forming process operation of the color-image forming portion at a time of the black-image forming process of the black-image forming portion.

According to the invention, at a time of the black-image forming process the identification information image inherent to the image forming apparatus which has performed the image forming process is formed on a recording medium together with a black image. Accordingly, the image forming apparatus which has performed the image forming process is identified by the identification information image formed on the recording medium together the black image, so that an unfaithful image formation regarding a black image of a document which should be held in a secret state or the like is suppressed. Also, a color-image forming process operation in the first color-image forming portion is invalidated at a time of the black-image forming process. That is, only image forming operations in the black-image forming portion and the identification information image forming portion are made effective. Accordingly, only a black image and an identification information image are accurately formed on a recording medium at a time of the black-image forming process.

In the invention it is preferable that the image forming apparatus further comprises black-image formation inhibiting means for inhibiting performing of the black-image forming process operation in the black-image forming portion when formation of the identification information image effected by the identification information image forming portion is not allowed.

According to the invention, when identification information image inherent to an image forming apparatus which has performed image forming can not be formed on a recording medium, performing of the black-image forming process is inhibited. Accordingly, an identification information image for identifying an image forming apparatus which has performed image forming is necessarily formed on each recording medium on which a black image has been formed, and the image forming apparatus which has performed the image forming process is securely identified from an image on which a black image has been formed. Accordingly, performing of an unjust image forming process regarding a black image of a document to be held in a secret state or the like can securely be suppressed.

In the invention it is preferable that a recording medium on which an image is formed is conveyed in a state where the recording medium is opposed to the respective image forming portions at predetermined intervals in between and the color-image forming disabling means opens up the predetermined intervals between the recording medium and the color-image forming portion at a time of the black-image forming process in the black-image forming portion.

According to the invention, the color-image forming operation in the first color-image forming portion is invalidated at a time of the black-image forming process by conveying the recording medium in a state where the interval between the color-image forming portion and the recording medium is opened up largely. Accordingly, a color image and an identification information image is further securely prevented from being formed on the recording medium.

In the invention it is preferable that the image forming apparatus comprises further one or more color-image forming portions, the first color-image forming portion and the one or more color-image forming portions are disposed adjacent to one another along a recording medium conveying direction, and the color-image forming disabling means opens up the intervals between the respective color-image forming portions and the recording medium largely in an integrated manner.

According to the invention, the color-image forming operations in the color-image forming portions are invalidated at a time of the black-image forming process by conveying the recording medium in a state where the intervals between the plurality of the color-image forming portions and the recording medium are opened up largely in an integrated manner. Accordingly, by a very simple configuration and control, a color image and an identification information image can securely be prevented from being formed on a recording medium at a time of the black-image forming process.

In the invention it is preferable that each of the image forming portions accommodates image forming material for each color, and an amount of the image forming material accommodated in the identification information image forming portion is made larger than an amount of the image forming material accommodated in each of the color-image forming portions.

According to the invention, a larger amount of image forming material than that in each color-image forming portion is accommodated in the identification information image forming portion. Accordingly, even when black-image forming process frequency is high, only the image forming material in the identification information image forming portion is prevented from being consumed earlier, so that an identification information image can be formed over a long time on a recording medium on which a black image has been formed.

The invention further provides an image forming apparatus comprising:

a plurality of image forming portions for forming an image on a recording medium, disposed adjacent to one another along a direction of conveying the recording medium, the recording medium being conveyed so as to oppose each of the plurality of image forming portions at predetermined intervals in between in forming an image thereon, the plurality of image forming portions including:
a black-image forming portion for carrying out a black-image forming process for forming a black image on the recording medium; and
a plurality of color-image forming portions for carrying out a color-image forming process for forming color images on the recording medium, respectively; and
an identification information adding portion for adding identification information data which represents identification information inherent to the apparatus, wherein a single color-image forming portion of the plurality of color-image forming portions which is positioned adjacent to the black-image forming portion performs an identification information image forming process for forming an identification information image, based on the identification information data which has been added by the identification information adding portion, on the recording medium at a time of the black-image forming process, the image forming apparatus further comprising:
color-image forming disabling means for disabling color-image forming process operations of color-image forming portions of the plurality of color-image forming portions except the single color-image forming portion, at a time of the black-image forming process of the black-image forming portion.

According to the invention, the single color-image forming portion of the plurality of color-image forming portions which is positioned adjacent to the black-image forming portion corresponds to the identification information image forming portion. An identification information image inherent to the image forming apparatus is formed together with a black image on a recording medium at a time of the black-image forming process, the color-image forming process operations of the color-image forming portions except the single color-image forming portion for performing the identification information image forming process are invalidated at a time of the black-image forming process, and only the image forming operations of the black-image forming portion and the single color-image forming portion as the identification information image forming portion positioned adjacent to the black-image forming portion are made effective. In this way at a time of the black-image forming process, only an black image and the identification information image are accurately formed on the recording medium. Accordingly, the image forming apparatus which has performed the black-image forming process is identified by the identification information image on the recording medium, and an unfaithful black-image forming process regarding documents to be held in a secret state or the like is suppressed.

In the invention it is preferable that the image forming apparatus further comprises black-image forming inhibiting means for inhibiting carrying-out of black-image forming process operation of the black-image forming portion, when the formation of the identification information image by the single color-image forming portion is disabled.

According to the invention, when the identification information image inherent to the image forming apparatus can not be formed on the recording medium, performing the black-image forming process is inhibited. Accordingly, a black image formed on a recording medium necessarily includes the identification information image for identifying the image forming apparatus, and the image forming apparatus which has performed the image forming process is securely identified by the identification information image on the recording medium. Thus, unfaithful black-image formation of documents to be held in a secret state or the like can securely be suppressed.

In the invention it is preferable that the color-image forming disabling means opens up the predetermined intervals between the respective color-image forming portions except the single color-image forming portion and the recording medium at a time of the black-image forming process of the black-image forming portion.

According to the invention, color-image forming process operations of the color-image forming portions except the single color-image forming portion at a time of the black-image forming process are invalidated by conveying the recording medium in a state where the intervals between the color-image forming portions and the recording medium are largely opened up. Thereby, the color-image formation on the recording medium can be more securely prevented at a time of the black-image forming process and only a black image and an identification information image are formed thereon.

In the invention it is preferable that each of the image forming portions accommodates image forming material for each color, and an amount of the image forming material accommodated in the single color-image forming portion is made larger than an amount of the image forming material accommodated in each of the plurality of color-image forming portions except the single color-image forming portion.

According to the invention, a larger amount of image forming material than that accommodated in the other color-image forming portions is accommodated in the identification information image forming portion which is the single color-image forming portion of the plurality of color-image forming portions which performs an identification information image forming process. Accordingly, even when a frequency of the black-image forming process is high and the identification information image forming portion is a color-image forming portion for forming an image of one color at a time of the color-image forming process, only the image forming material in the identification information image forming portion is prevented from being consumed earlier, so that an identification information image can be formed over a long time on a recording medium at a time of the black-image forming process.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
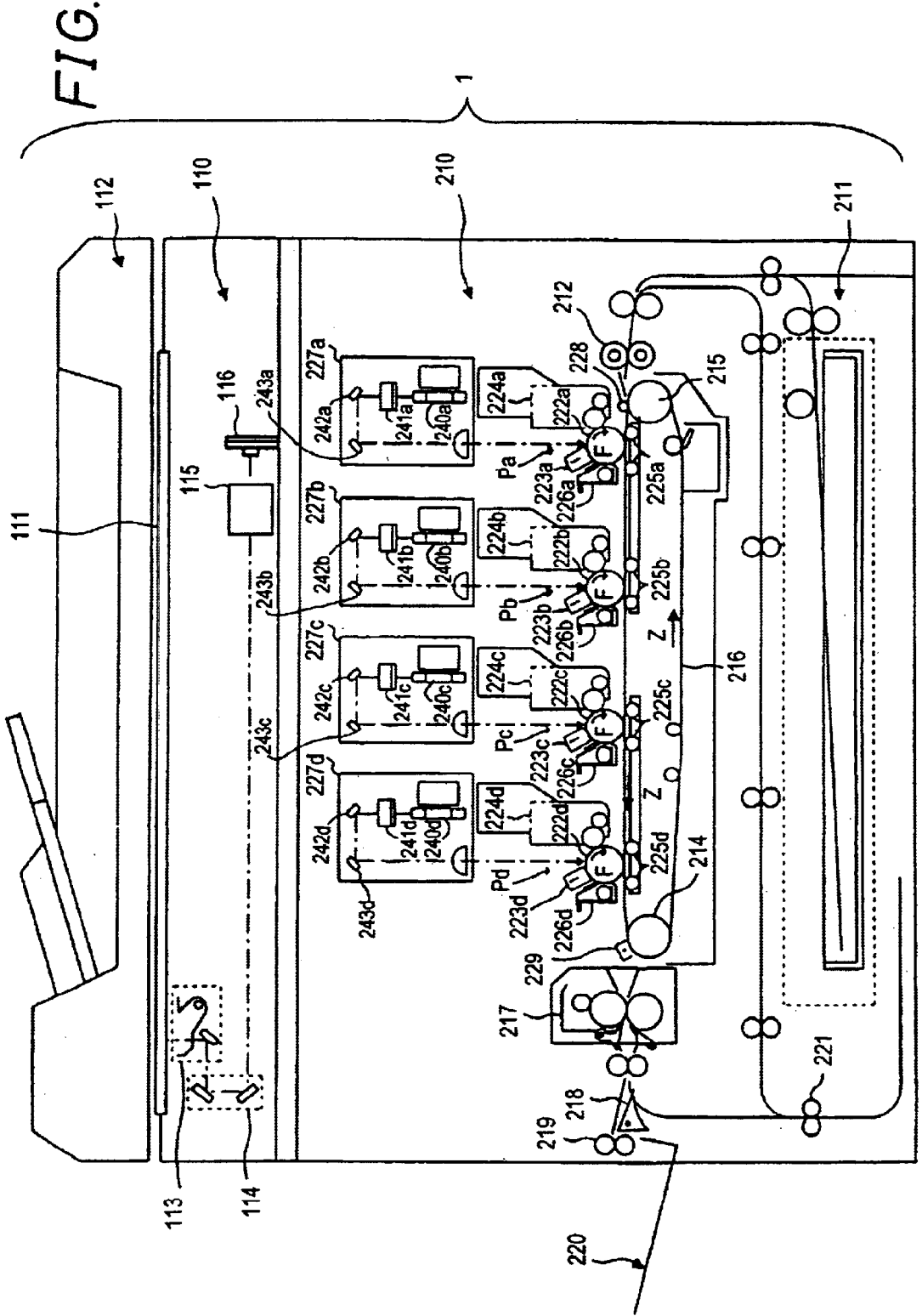
FIG. 1 is a schematic front sectional view showing a configuration of a reproducing machine which is an image forming apparatus according to an embodiment of the invention.

Now referring to the drawings, preferred embodiments of the invention are described below.

FIG. 1 is a schematic front sectional view showing a configuration of a digital color reproducing machine (hereinafter, referred to as a reproducing machine) which is an image forming apparatus according to an embodiment of the invention. An original stand 111 and an operation panel (not shown) are provided on an upper face of a reproducing machine 1, and an automatic original feeding device 112 is mounted so as to be opened and closed on an upper face of the original stand 111. Inside the reproducing machine 1, an image reading portion 110 and an image forming portion 210 are configured. Also, a paper feeding portion 211 is formed at a lowermost portion inside the reproducing machine 1.

The automatic original feeding device 112 feeds originals set on an original tray one by one at a predetermined position on an upper face of the original stand 111 with a state where one face of each of the originals is opposed to the upper face of the original stand 111. Also, the automatic original feeding device 112 reveres each original whose one face has been subjected to an image reading process to feed the original at the predetermined position on the upper face of the original stand 111 in a state where the other face of the original is opposed to the upper face of the original stand 111. When the image reading process for one original is completed, the original is ejected, and all the originals which have been set on the original tray are sequentially fed. Feeding processes of the original including the reversing process in the automatic original feeding device 112 are controlled in relation to operation of the entire reproducing machine 1.

The image reading portion 110 reads an image of each original which has been fed to the upper face of the original stand 111 by the automatic original feeding device 112. Therefore, the image reading portion 110 comprises a first mirror base 113 and a second mirror base 114 moved along an lower face of the original stand 111. The first mirror base 113 is mounted with an exposing lump and a mirror, and is reciprocated at a predetermined speed below the lower face of the original stand 111. The second mirror base 114 is mounted with two mirrors, and is reciprocated at half of the speed of the first mirror base 113 below the lower face of the original stand 111.

Light illuminated from the exposing lump mounted on the first mirror base 113 is reflected on an image face of the original, the light is further reflected on the mirrors mounted on the first mirror base 113 and the second mirror base 114, and the light is focused on a light receiving face of a photoelectric conversion element 116 by a lens 115. The photoelectric conversion element 116 outputs light-receiving signal corresponding to an amount of light reflected on the light receiving face. The light-receiving signal outputted from the photoelectric conversion element 116 is subjected to a predetermined process at an image processing portion described later and is used as image data.

A paper feeding portion 211 feeds a plurality of paper sheets accommodated in a paper feeding cassette one by one. Each paper sheet fed from the paper feeding portion 211 is introduced into the image forming portion 210 at timing synchronized with operation of the image forming portion 210. A conveying belt 216 rotating in a direction of arrow Z is entrained about a pair of rollers 214, 215 to be disposed in a lower portion of the image forming portion 210, and the paper sheet introduced into the image forming portion 210 is conveyed within the image forming portion 210 in a state where the paper sheet is electrostatically attracted on a surface of the conveying belt 216.

Inside the reproducing machine body 100, a fusing device 217 is disposed so as to correspond to a downstream portion of an upper face of the conveying belt 216 in the arrow Z direction. The fusing device 217 heats and pressurizes a paper sheet on which a developer image has been transferred in the image forming portion 210 to fuse or fix the developer image on the surface of the paper sheet. The paper sheet which has passed through the fusing device 217 is ejected by an ejecting roller pair 219 into an ejected paper sheet tray 220 mounted on one side of the reproducing machine body 100. Also, a gate 218 disposed between the fusing device 217 and the ejecting roller pair 219 introduces a paper sheet which has passed the fusing device 217 to be reproduced on one surface into a switchback conveying path 221 in a duplex reproducing mode. The paper sheet which has been reproduced on one surface and has been introduced into the switchback conveying path 221 is introduced again into the image forming portion 210 with a reversed state.

In the image forming portion 210, 4 image forming stations Pa to Pd are disposed so as to correspond to an upper face of the conveying belt 216 from an upstream side along the paper sheet conveying direction of arrow Z in this order. The image forming station Pa is an image forming portion for forming a black image in the invention, which performs image forming with black toner. The image forming station Pb is an image forming portion for forming an identification information image of this invention, which performs image forming with yellow toner. The image forming station Pc performs image forming with magenta toner. The image forming station Pd performs image forming with cyan toner. Accordingly, the image forming stations Pa to Pd oppose an upper face of the paper sheet conveyed by the conveying belt 216 within the image forming portion 210 in this order, and a black toner image, an yellow toner image, a magenta toner image, a cyan toner image are formed on the upper face of the paper sheet in this order at a time of the color-image forming process. Incidentally, at a time of the black-image forming process, only a black toner image and an yellow toner image are formed on a paper sheet in this order by configuration and control described later.

Each of the image forming stations Pa to Pd has substantially the same configuration or structure. As one example, the image forming station Pa includes a photosensitive drum 222a driven and rotated in arrow F direction at a constant speed, a charging device 223a applying single polarity charges on a surface of the photosensitive drum 222a uniformly, a developing device 224a for developing an electrostatic latent image which has been formed on a surface of the photosensitive drum 222a to a developer image, a transferring device 225a for transferring the developer image which has been carried on the surface of the photosensitive drum 222a on to a surface of a paper sheet, and a cleaner 226a for removing residual developer from the surface of the photosensitive drum 222a which has passed through a position opposed to the transferring device 225a via the conveying belt 216.

Scanner units 227a to 227d are respectively disposed above the image forming stations Pa to Pd. The scanner units 227a to 227d illuminate image lights based upon image data which has been separated into black color, yellow color, magenta color and cyan color on to respective surfaces of the photosensitive drums 222a to 222d on which charges have been applied from the charging devices 223a to 223d. The scanner units 227a to 227d have basically the same structure. As one example, the scanner unit 227a is provided with a polygon mirror 240a for deflecting laser light which has been irradiated from a semiconductor laser device and has been modulated by black image data in a direction of a main or fast scanning direction, and an fθ lens 241a and mirrors 242a and 243a for focusing the laser light which has been deflected by the polygon mirror 240a on a surface of the photosensitive drum 222a at a predetermined irradiating angle.

A photoconductive layer is formed on respective surfaces of the photosensitive drums 222a to 222d, and charges on portions of the photosensitive drums 222a to 222d which have been subjected to laser light irradiation by the scanner units 227a to 227d are selectively removed due to photoconductive action, so that electrostatic latent images based on respective color-image data are formed on the respective surfaces of the photosensitive drums 222a to 222d. Furthermore, the developer devices 224a to 224d respectively supply developers having the same colors as colors corresponding to image data which have modulated laser lights which have been irradiated from the scanner units 227a to 227d on the respective surfaces of the photosensitive drums 222a to 222d. Thereby, developer images of respective colors are formed on the respective surfaces of the photosensitive drums 222a to 222d.

In the respective image forming stations Pa to Pd, timings at which laser lights are irradiated from the scanner units 227a to 227d are determined based upon a moving speed of an upper face of the conveying belt 216 in the arrow Z direction and arrangement intervals or spacings among the photosensitive drums 222a to 222d, and developer images of respective colors carried on photosensitive drums 222a to 222d are superimposed at the same position on an a surface of a paper sheet.

Also, a charging device 228 contacts with on an upper face of the conveying belt 216 upstream of the image forming station Pa along the arrow Z direction, and a charge eliminating device 229 contacts with an upper face of the conveying belt 216 downstream of the image forming station Pd along the arrow Z direction. The charging device 228 applies charges for electrostatically attracting a paper sheet on a surface of the conveying belt 216 on surfaces of the conveying belt 216 and a paper sheet. The charge eliminating device 229 performs corona discharging for separating a paper sheet from a surface of the conveying belt 216.

Incidentally, in some cases, a post-processing device such as a sorter or the like may be mounted on a side face of a paper ejecting side. Also, a plurality of paper feeding cassettes may be stacked in the paper sheet feeding portion 210, in which a paper sheet is fed selectively from any one of the plurality of paper feeding cassettes.

Also, the scanner units 227a to 227d are not limited to ones where laser light is irradiated as image light based on image data, but the units 227a to 227d may be ones where light of light emitting diodes is irradiated on each of the photosensitive drums 222a to 222d via an imaging lens array.

Figure 2:
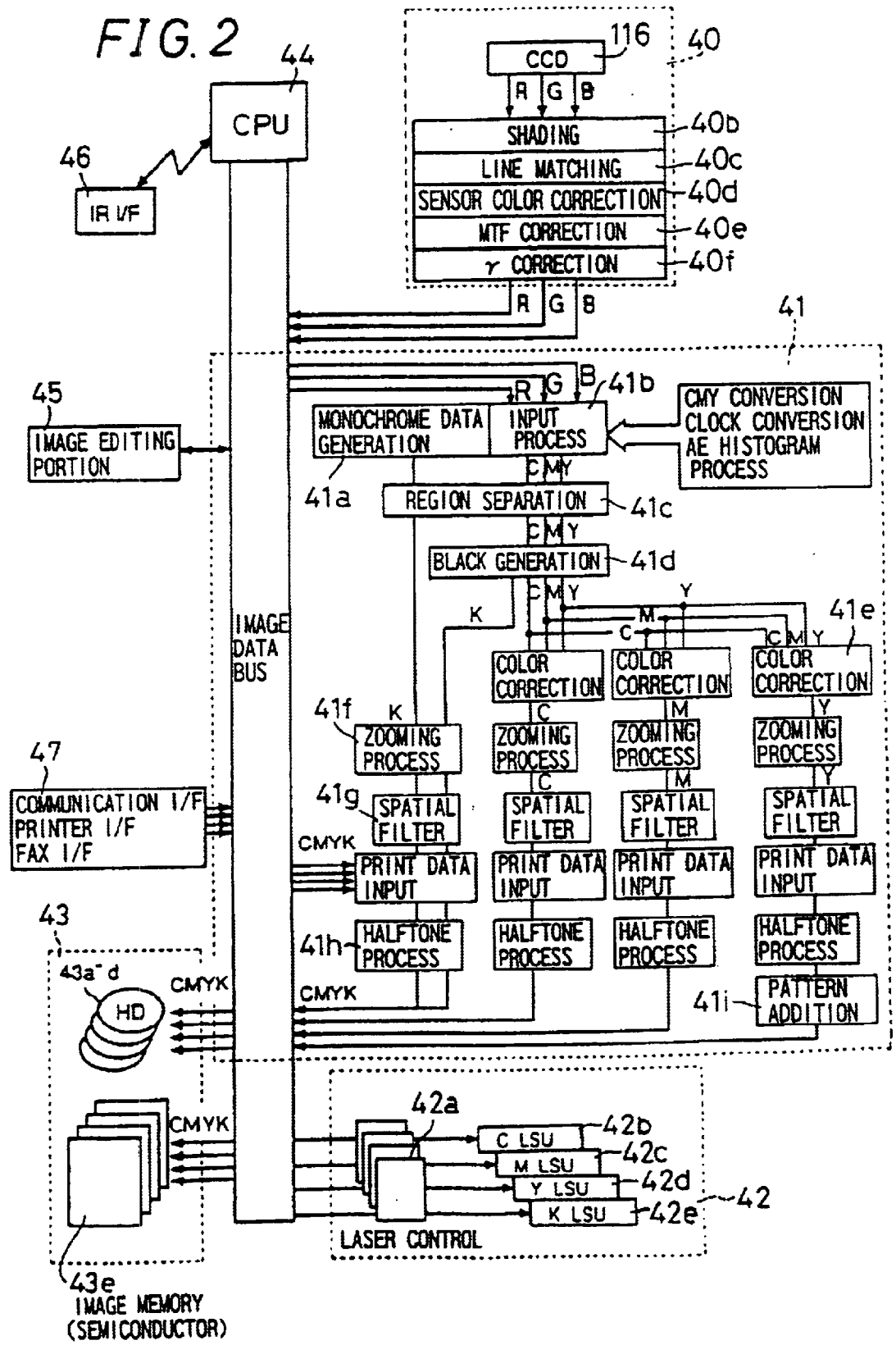
FIG. 2 is a block diagram showing a configuration of a main portion of a control portion of the reproducing machine.

FIG. 2 is a block diagram showing a configuration of a main portion of a control portion of the reproducing machine. Connected to a CPU 44 constituting a control portion of the reproducing machine 1 via an image data bus are an image data input portion 40, an image processing portion 41, an image data output portion 42, a memory 43, an image edition portion 45 and a communication interface 47.

The image data input portion 40 includes a photoelectric conversion element 116 disposed in the image reading portion 110. The photoelectric conversion element 116 reads an image of a monochrome original or a color original to output line data where the image has been color-separated into respective color components of RGB. Also, the image data input portion 40 includes a shading correction circuit 40b for correcting a line image level of the line data outputted from the photoelectric conversion element 116, a line matching portion 40c for correcting deviation among respective line image data of three colors, such as line buffers or the like, a sensor color correction portion 40d for correcting color data of the line image data of the respective colors, an MTF correction portion 40e for correcting contract of signal for each pixel, a γ correction portion 40f for correcting intensity of image to correct luminosity factor, and the like.

The image processing portion 41 includes a black color data generating portion 41a for generating monochrome data from RGB signals which are color-image signals inputted from the image data input portion 40, an input processing portion 41b for converting RGB signals to YMC signals corresponding to subtractive 3 primary colors and for performing clock conversion, a region separating portion 41c for classifying the inputted image data to a character region, a halftone dot photographic region or a photographic paper photographic region, a black generating portion 41d for performing a background color removing process on the basis of the YMC signals outputted from the input processing portion 41b to generate black-image data, color correcting circuits 41e for adjusting respective colors of color-image signals on the basis of respective color conversion tables, zooming processing circuits 41f for changing magnitude of the inputted image data on the basis of a set magnitude, spatial filters 41g, halftone processing portions 41h for performing a processing for improving tone characteristic such as multi-value error diffusion process, multi-value dither process or the like.

Provided in the image processing portion 41 is an identification pattern adding portion 41i which is an identification information adding portion of the invention. The identification pattern adding portion 41i adds predetermined identification information to image data as an yellow image with a low visibility without injuring characteristic of inputted image data. The identification information includes at least identification information inherent to the digital color reproducing machine 1, and selectively includes inherent identification information for identifying an apparatus from which image data has been inputted into the digital color reproducing machine 1.

Image data which has been subjected to various processes in the image processing portion 41 is temporarily stored in the image memory 43. The image memory 43 receives image data of 32 bits which are serially outputted from the image processing portion 41, converts the image data into image data of 8 bits for each color of yellow, magenta, cyan and black while being temporarily stored in a buffer, and the image data of 8 bits are respectively stored in 4 hard disks 43a to 43d. When image data is outputted from the image memory 43 to the image data output portion 42, since opposing timings at which a recording paper sheet is opposed to the respective image stations Pa to Pd in the image forming portion 210 are different from one another, appropriate output timings for image data of the respective colors are different from one another. Accordingly, buffer memories 43e are provided in the image memory 43, and image data for respective colors are sequentially outputted via the buffer memories 43e with delayed timings so as to correspond to arrangement positions of the corresponding image stations Pa to Pd.

The image data output portion 42 includes laser control units 42a for performing pulse width modulation on the basis of image data of respective colors outputted from the halftone processing portions 41h and the identification pattern adding portion 41i in the image processing portion 41, and the scanner units 227a to 227d for irradiating laser lights on surfaces of the photosensitive drums 222a to 222d on the basis of pulse width modulation signals outputted from the laser control units 42a.

Image data is inputted into an IR interface (I/F) 46 from a digital still camera 4, a digital video camera 5, or an external image input device such as a portable terminal device or the like without passing through a cable. Meanwhile, image data is inputted into a communication interface 47 via a personal computer, a facsimile or the like through a cable, a network cable and the like. Namely, the communication interface 47 functions as a printer interface and a facsimile interface. A predetermined image process is performed on image data inputted from the interfaces 46, 47 in the image processing portion 41. Incidentally, when image data inputted from the interfaces 46, 47 are YMC signals, the image data is not processed in the input processing portion 41b.

The image edition portion 45 performs edition processing on image data stored in the image memory 43 on the basis of edition contents set according to operation of an operation panel.

The image data input portion 40, the image processing portion 41, image data output portion 42, the memory 43, image edition portion 45, the IR interface 46 and the communication interface 47 are controlled in an integrated manner by the CPU 44 through the image processing portion 41.

Incidentally, the identification pattern adding portion 41*i* not only adds identification information to image data of yellow (Y) which has been subjected to various processes at a time of color-image forming but also adds identification information to image data of yellow (Y) at a time of black-image forming. Accordingly, a paper sheet on which an image has been formed in the image forming apparatus 1 is necessarily added with identification information.

Figure 3:
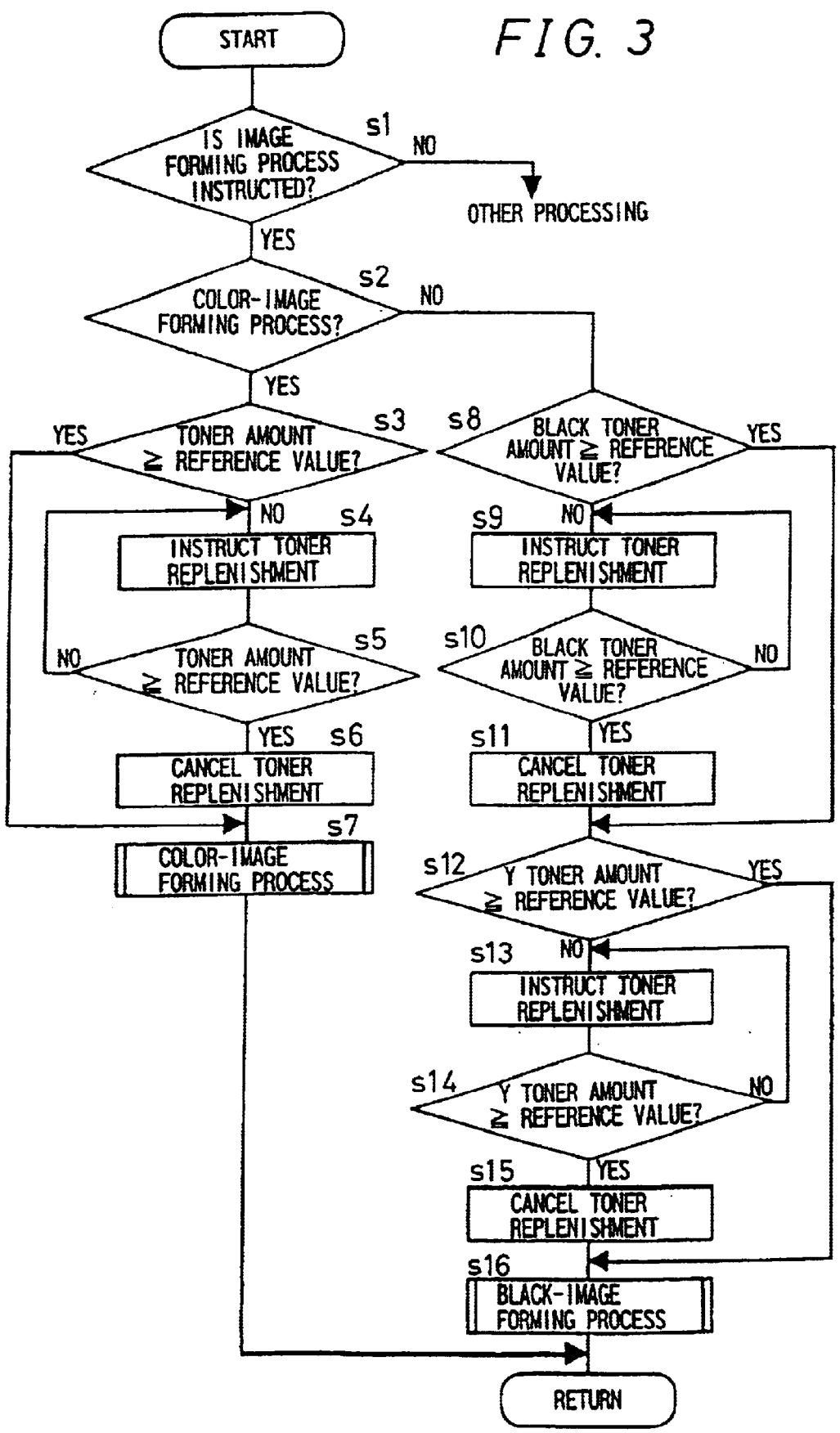
FIG. 3 is a flow chart showing a portion of a processing procedure in the control portion of the reproducing machine.

FIG. 3 is a flow chart showing a portion of a processing procedure in the control portion of the reproducing machine. When start of the image forming process is instructed by operation of a start key on the operation panel or input of command data from an external device (s1), the CPU 44 configuring the control portion of the reproducing machine 1 determines whether or not the instruction is for the image forming process (color-image forming process) (s2); determines whether or not the accommodation amounts of respective color toners in the developer devices disposed in the image forming stations Pa to Pd are equal to or more than reference values, respectively at a time of the color-image forming process (s3); and, when the accommodation amount of toner in any of the developer devices is less than corresponding reference value, displays a message for demanding replenishment of the corresponding toner on a display of an apparatus panel to wait for replenishment of the toner (s4). When the accommodation amounts of toners in all the developer devices becomes equal to or more than the reference values, the CPU 44 resets the display on the display to perform the color-image forming process (s5 to s7).

On the other hand, at a time of the black-image forming process, the CPU 44 determines whether or not the accommodation amount of toner in the developer device in the image forming station for forming a black image is equal to or more than the reference value (s8); and, when the accommodation amount of black toner is less than the reference value, displays a message for demanding replenishment of black toner on the display to wait for replenishment of black toner (s9 to s11). When the accommodation amount of black toner is more than the reference value, the CPU 44 determines whether or not the accommodation amount of yellow toner is equal to or more than the reference value (s12); and, when the accommodation amount of yellow toner is less than the reference value, displays a message for demanding replenishment of yellow toner to wait for replenishment of yellow toner (s13 to s15). The CPU 44 performs the black-image forming process only when both of the accommodation amounts of black toner and yellow toner are equal to or more than the reference values (s16).

Thus, when start of the black-image forming process is instructed, by determining whether or not the accommodation amounts of not only black toner used for image forming about image data but also yellow toner used for image forming of a pattern image representing identification information are sufficient in the corresponding developer devices, a pattern image representing identification information identifying the reproducing machine 1 is securely formed with yellow toner on a paper sheet on which a black image has been formed.

Identically, the determining processes of the steps s3, s8 and s12 are not limited to only the determinations about whether or not the accommodation amounts of toners in the developer devices in the respective image forming stations are equal to or more than the reference values, but other processes relating to determination about whether or not operations are allowed in the respective image forming stations may be performed.

Also, in a conventional color-image forming apparatus, a capacity or volume of a hopper of a developer device accommodating frequently-used black toner is generally made larger than the capacities of hoppers of developer devices accommodating the other color toners. In the reproducing machine 1 according to the embodiment of the invention, however, since the usage frequency of yellow toner becomes higher than those of magenta toner and cyan toner, the capacity of the hopper in the developer device accommodating yellow toner is made larger than those of the hoppers in the developer devices accommodating magenta toner and cyan toner, so that the frequency where the black-image forming process is limited due to decrease in the accommodation amount of yellow toner may be suppressed.

Figure 4:
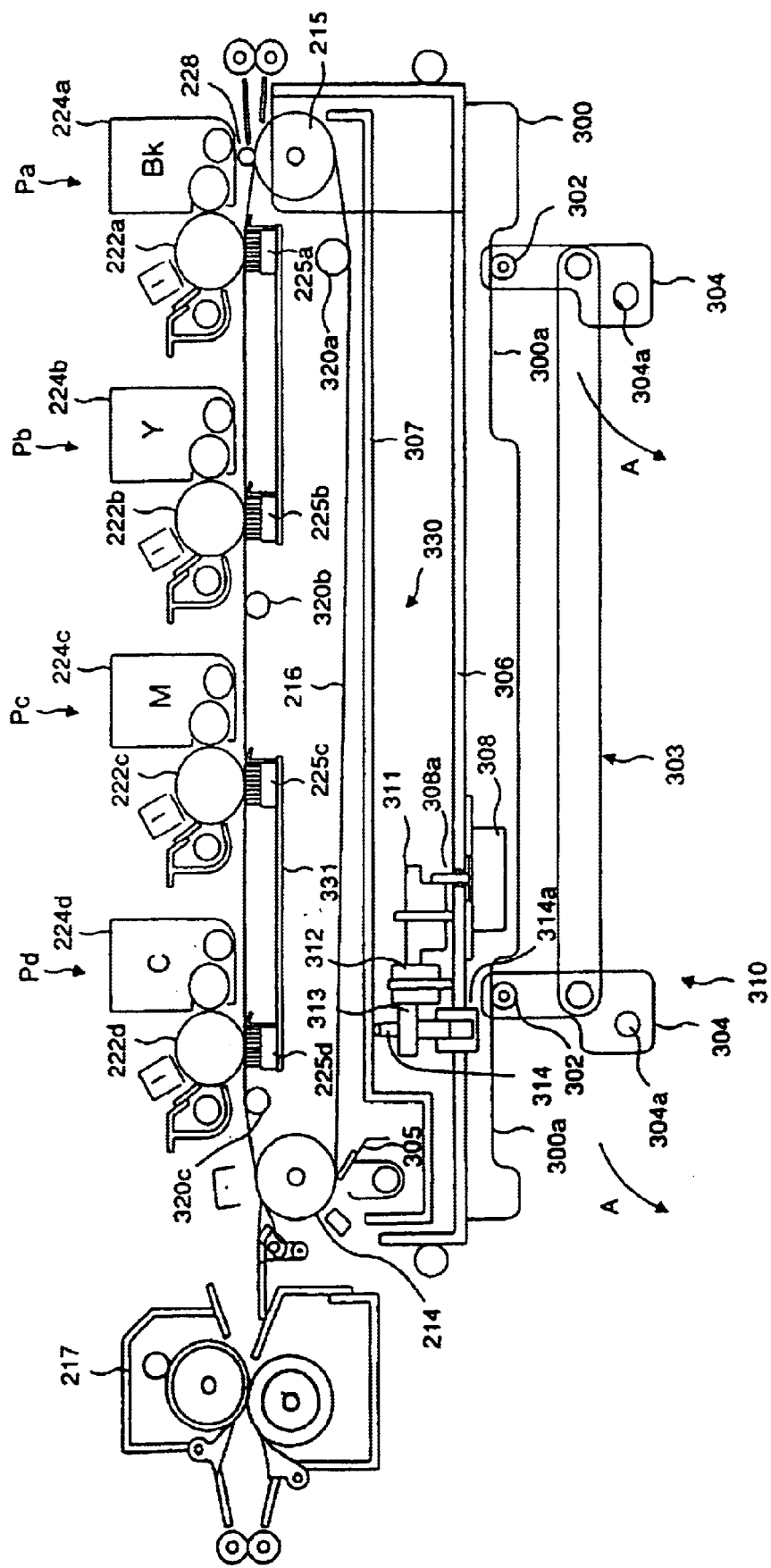
FIG. 4 is a schematic view showing a configuration of a main portion of the reproducing machine.

FIG. 4 is a schematic view showing a main portion of the reproducing machine. In the image forming portion 210 of the reproducing machine 1, the driving roller 214 and the idle roller 215 entrained with the transfer conveying belt 216 are rotatably supported to a frame 300. The frame 300 is supported by an elevating mechanism 310 disposed below the frame 300. That is, recessed portions 300*a*, 300*b* are formed at a lower face of the frame 300, and carrying rollers 302 rotatably supported to upper portions of a pair of supporting pieces 304 constituting the elevating mechanism 310 abut on the respective recessed portions 300*a*, 300*b* from the bottom.

In the elevating mechanism 310, respective lower portions of the pair of supporting pieces 304 are rotatably supported about fulcrum points 304*a*, and intermediate portions of the pair of supporting pieces 304 are engaged with both ends of a rod 303. By operating a handle (not shown) fixed to one of the pair of supporting pieces 304, the pair of supporting pieces 304 connected to each other by the rod 303 are moved in the same direction. The supporting pieces 304 are rotatable between a position shown in FIG. 4 and a position which has been rotated 90° in arrow A direction from the position shown in FIG. 4.

In a state where,the supporting pieces 304 have been put in the positions shown in FIG. 4, the frame 300 causes the transfer conveying belt 216 to approach to the photosensitive drums 222*a* to 222*d* disposed in the respective image forming stations Pa to Pd, in which toner images of respective colors in the respective image forming stations Pa to Pd can be transferred on a paper sheet being conveyed on the transfer conveying belt 216. On the other hand, in a state where the supporting pieces 304 have been rotated 90° in the arrow A direction from the position shown in FIG. 4, the frame 300 is moved downward, in which the transfer conveying belt 216 is spaced from the photosensitive drums 222*a* to 222*d* which are respectively disposed in the image forming stations Pa to Pd and a paper sheet stopped on the transfer conveying belt 216 can be removed easily. Thus, by operating the supporting pieces 304 with the handle provided on the elevating mechanism 310, the frame 300 is moved between an upper side position at a time of image forming and a lower side position at a time of jamming handling.

Tensioning rollers 320*a* to 320*c* and transferring devices 225*a* to 225*d* together with the driving roller 214 and the idle roller 215 are supported to the frame 300. The tensioning rollers 320*a* to 320*c* apply a constant tension on the transfer conveying belt 216. The driving roller 214, the tensioning roller 320*c* and the transferring devices 225*c*, 225*d* are supported to the frame 330 via a portion separating mechanism 330 assembled inside the frame 300 so as to be movable in upward and downward directions.

The portion separating mechanism 330 includes a supporting member 331, a movable member 307, a motor 308, gears 311 to 313, and an elevating rod 314 which are separating or spacing means of the invention. The transferring device 225c included in the image forming station Pc for forming a magenta image and the transferring device 225d included in the image forming station Pd for forming a cyan image are fixed to the supporting member 331. The supporting member 331 is movable in upward and downward directions, and the member 331 together with the driving roller 214 and the tensioning roller 320c is engaged with the movable member 307 via a transmission member (not shown).

The movable member 307 has a length corresponding to a range of the 4 image forming stations Pa to Pd along in the paper sheet conveying direction, and an upper end of the elevating rod 314 abuts on a portion of a lower face of the movable member 307 opposed to the image forming station Pd disposed at the most downward position along the paper sheet conveying direction. Rotation of a rotating shaft 308a of the motor 308 is transmitted to the elevating rod 314 via the gears 311 to 313. The elevating rod 314 is engaged in a threading manner with a screw hole 314a formed at a screw portion provided at a lower portion of the frame 300. Accordingly, the elevating rod 314 is moved in upward and downward directions according to rotating direction effected by the motor 308 via the gears 311 to 313.

In a state where the elevating rod 314 is put in the upper side position shown in FIG. 4, the driving roller 214, the tensioning roller 320c and the supporting member 331 together with the movable member 307 are put in the upper side positions and the transfer conveying belt 216 and the transferring devices 225c, 225d are positioned close to the photosensitive drums 222c, 222d included in the image forming stations Pc, Pd, so that 4 color images can be formed on a paper sheet from all of the image forming stations Pa to Pd.

Figure 5:
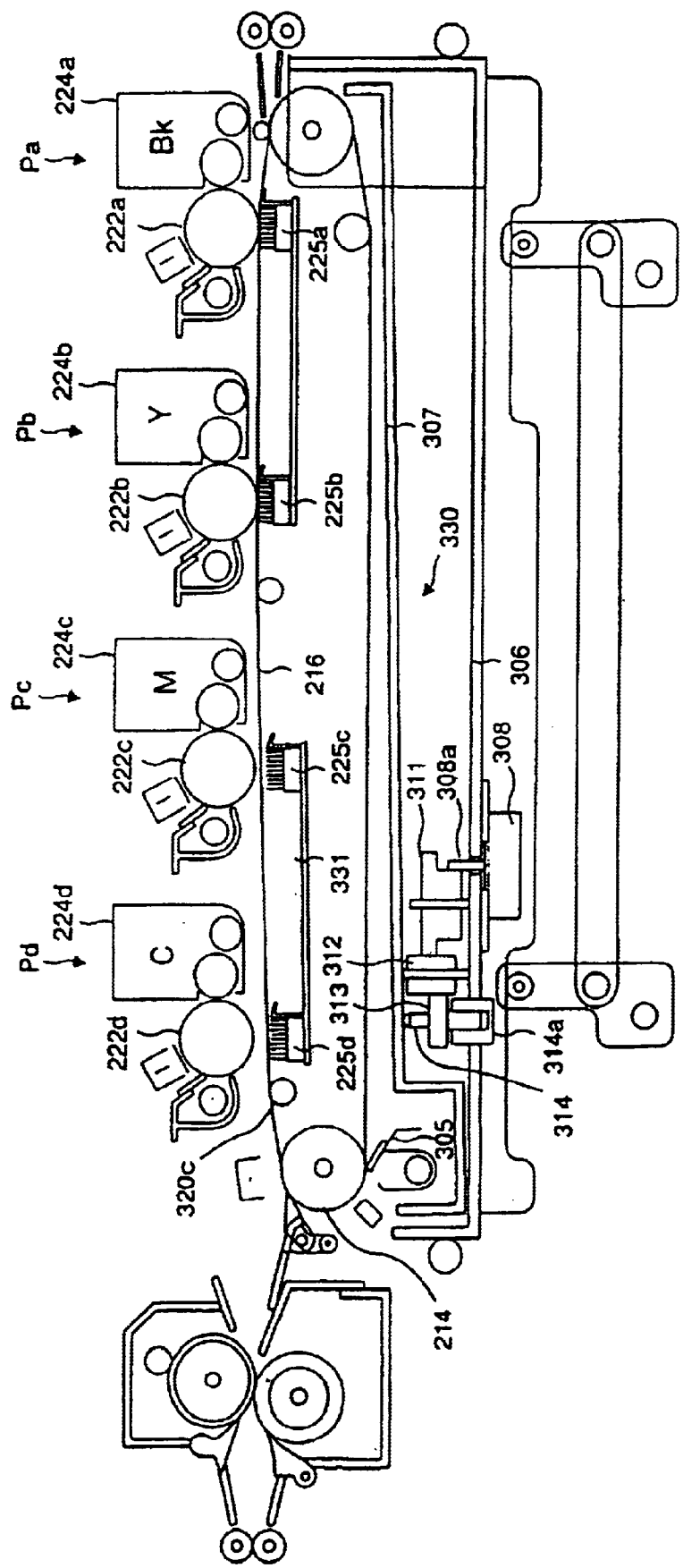
FIG. 5 is a schematic view showing operation of the main portion of the reproducing machine at a time of the black-image forming process.

When the motor 308 is rotated in a predetermined direction from the state where the elevating rod 314 has been positioned at the upper side position shown in FIG. 4, the elevating rod 314 is moved at a lower side position shown in FIG. 5. In the state where the elevating rod 314 has been positioned at the lower side position shown in FIG. 5, the driving roller 214, the tensioning roller 320c and the supporting member 331 together with the movable member 307 are positioned at the lower side position, and the transfer conveying belt 216 and the transferring devices 225c, 225d are spaced from the photosensitive drums 222c, 222d included in the image forming stations Pc, Pd, so that a black image and a yellow image can be formed on a paper sheet at the image forming stations Pa, Pd, but a magenta image and a cyan image can not be formed by the image forming stations Pc, Pd.

From the above, by selectively positioning the elevating rod 314 at the upper side position or the lower side position according to driving of the motor 308 in the portion separating mechanism 330, the full-color-image forming process for making all the image forming stations Pa to Pd operable to form a color image including 4 colors of black, yellow, magenta, and cyan and the black-image forming process including a process for enabling only the image forming stations Pa and Pb to form a pattern image of identification information by only black toner and yellow toner can be set to their corresponding states.

In the image forming apparatus according to the embodiment, as the image forming station Pa for performing black toner image forming and the image forming station Pb for performing yellow toner image forming are disposed upstream of the image forming station Pc for performing magenta toner image forming and the image forming station Pd for performing cyan toner image forming in a state where the image forming station Pa and the image forming station Pb are positioned adjacent to each other, the image forming stations Pc and Pd which should be disabled, or made inoperable, at a time of the black-image forming process can be moved in upward and downward directions by the single portion separating mechanism 330.

Incidentally, in an assumption where the image forming stations Pa and Pb are disposed upstream of the image forming stations Pc and Pd along the paper sheet conveying direction, the arrangement order of the image forming stations Pa and Pb and the arrangement order of the image forming stations Pc and Pd can be determined arbitrarily.

Figure 6:
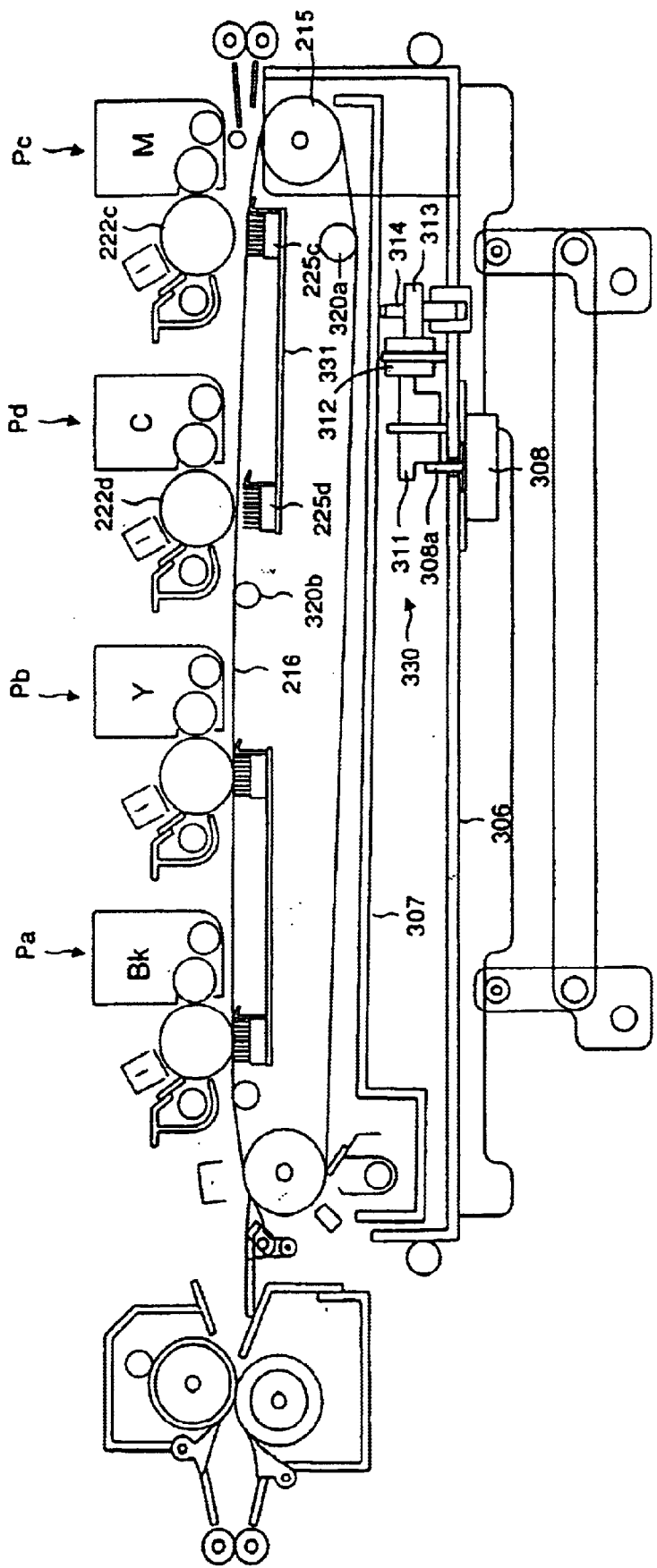
FIG. 6 is a schematic view showing another configuration of the main portion of the reproducing machine.

Also, as shown in FIG. 6, the image forming stations Pa and Pb can be arranged downstream of the image forming stations Pc and Pd along the paper sheet conveying direction. In this case, the idle roller 215 and the tensioning roller 320b are supported to the frame 300 so as to be movable in upward and downward directions, and the elevating rod 314 of the portion separating mechanism 330 is caused to abut on a portion of the lower face of the movable member 307 opposed to the image forming station at the most upstream side along the paper sheet conveying direction. In the configuration shown in FIG. 6, assuming that the image forming stations Pa and Pb are arranged downstream of the image forming stations Pc and Pd along the paper sheet conveying direction, the arrangement order of the image forming stations Pa and Pb and the arrangement order of the image forming stations Pc and Pd can be determined arbitrarily.

Thus, by disposing the image forming station Pa and the image forming station Pb adjacent to each other, and disposing the image forming station Pc and the image forming station Pd adjacent to each other, the transfer conveying belt 216 are spaced from the photosensitive drums 222c and 222d in the image forming station Pc for performing magenta toner image forming and the image forming station Pd for performing cyan toner image forming so that image forming with magenta toner and cyan toner can be disabled simultaneously.

Incidentally, even in a black-image forming apparatus provided with only an image forming station for performing black toner image forming, by forming a pattern image representing identification information for identifying an image forming apparatus at an appropriate position on a paper sheet at a time of image forming based upon an image read by a reading portion or image data inputted from an external device, an image forming apparatus which has performed image forming for a black image whose contents should be kept secret can easily be identified from the image which has been formed on a paper sheet.

In the embodiment, also, the reproducing machine for performing electrophotographic type image forming has been explained as one example, but the invention can be implemented in an image forming apparatus for performing other image forming such as an ink jet type one.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
    a black-image forming portion for carrying out a black-image forming process for forming a black image on a recording medium;
    a first color-image forming portion for carrying out a color-image forming process by which a color image is formed on a recording medium;
    an identification information adding portion for adding identification information data which represents identification information inherent to the apparatus;
    an identification information image forming portion for carrying out a process of forming an identification information image based on the identification information which is added by the identification information adding portion, on the recording medium at a time of the black-image forming process; and
    color-image forming disabling means for disabling the color-image forming process operation of the color-image forming portion at a time of the black-image forming process of the black-image forming portion.

2. The image forming apparatus of claim 1, further comprising:
    black-image formation inhibiting means for inhibiting performing of the black-image forming process operation in the black-image forming portion when formation of the identification information image effected by the identification information image forming portion is not allowed.

3. The image forming apparatus of claim 1, wherein a recording medium on which an image is formed is conveyed in a state where the recording medium is opposed to the respective image forming portions at predetermined intervals in between and the color-image forming disabling means opens up the predetermined intervals between the recording medium and the color-image forming portion at a time of the black-image forming process in the black-image forming portion.

4. The image forming apparatus of claim 3, wherein the image forming apparatus comprises further one or more color-image forming portions, the first color-image forming portion and the one or more color-image forming portions are disposed adjacent to one another along a recording medium conveying direction, and the color-image forming disabling means opens up the intervals between the respective color-image forming portions and the recording medium largely in an integrated manner.

5. The image forming apparatus of claim 1, wherein each of the image forming portions accommodates image forming material for each color, and an amount of the image forming material accommodated in the identification information image forming portion is made larger than an amount of the image forming material accommodated in each of the color-image forming portions.

6. An image forming apparatus comprising:
    a plurality of image forming portions for forming an image on a recording medium, disposed adjacent to one another along a direction of conveying the recording medium,
    the recording medium being conveyed so as to oppose each of the plurality of image forming portions at predetermined intervals in between in forming an image thereon,
    the plurality of image forming portions including:
        a black-image forming portion for carrying out a black-image forming process for forming a black image on the recording medium; and
        a plurality of color-image forming portions for carrying out a color-image forming process for forming color images on the recording medium, respectively; and
        an identification information adding portion for adding identification information data which represents identification information inherent to the apparatus,
    wherein a single color-image forming portion of the plurality of color-image forming portions which is positioned adjacent to the black image forming portion performs an identification information image forming process for forming an identification information image, based on the identification information data which has been added by the identification information adding portion, on the recording medium at a time of the black-image forming process,
    the image forming apparatus further comprising:
        color-image forming disabling means for disabling color-image forming process operations of color-image forming portions of the plurality of color-image forming portions except the single color-image forming portion, at a time of the black-image forming process of the black-image forming portion.

7. The image forming apparatus of claim 6, further comprising:
    black-image forming inhibiting means for inhibiting carrying-out of black-image forming process operation of the black-image forming portion, when the formation of the identification information image by the single color-image forming portion is disabled.

8. The image forming apparatus of claim 6, wherein the color-image forming disabling means opens up the predetermined intervals between the respective color-image forming portions except the single color-image forming portion and the recording medium at a time of the black-image forming process of the black-image forming portion.

9. The image forming apparatus of claim 6, wherein each of the image forming portions accommodates image forming material for each color, and an amount of the image forming material accommodated in the single color-image forming portion is made larger than an amount of the image forming material accommodated in each of the plurality of color-image forming portions except the single color-image forming portion.

* * * * *